(12) United States Patent
Gidon (10) Patent No.: US 7,920,457 B2
(45) Date of Patent: Apr. 5, 2011

(54) DEVICE FOR RECORDING DATA COMPRISING MICRODOTS WITH FREE ENDS FORMING A CONVEX SURFACE AND METHOD FOR THE PRODUCTION THEREOF

(75) Inventor: Serge Gidon, La Murette (FR)

(73) Assignee: Commissariat A l'Energie Atomique, Paris (FR)

( * ) Notice: Subject to any disclaimer, the term of this patent is extended or adjusted under 35 U.S.C. 154(b) by 852 days.

(21) Appl. No.: 11/794,008

(22) PCT Filed: Dec. 22, 2005

(86) PCT No.: PCT/FR2005/003260
§ 371 (c)(1),
(2), (4) Date: Jun. 26, 2007

(87) PCT Pub. No.: WO2006/075065
PCT Pub. Date: Jul. 20, 2006

(65) Prior Publication Data
US 2008/0101206 A1    May 1, 2008

(30) Foreign Application Priority Data
Jan. 17, 2005  (FR) ........................... 05 00472

(51) Int. Cl.
*G11B 3/00*  (2006.01)
*G11B 9/00*  (2006.01)
(52) U.S. Cl. ..................... 369/127; 369/126
(58) Field of Classification Search .......... 369/126, 369/127
See application file for complete search history.

(56) References Cited

U.S. PATENT DOCUMENTS

| | | | |
|---|---|---|---|
| 5,015,850 A | 5/1991 | Zdeblick et al. | |
| 5,307,311 A | 4/1994 | Sliwa, Jr. | |
| 5,923,581 A | 7/1999 | Clerc et al. | |
| 6,072,764 A | 6/2000 | Shido et al. | |
| 6,922,353 B2 * | 7/2005 | Radominski et al. | 365/153 |
| 6,984,862 B2 * | 1/2006 | Liao et al. | 257/316 |
| 7,697,402 B2 * | 4/2010 | Gidon | 369/126 |

(Continued)

FOREIGN PATENT DOCUMENTS
EP    0 368 579 A2    5/1990
(Continued)

OTHER PUBLICATIONS

Steven W. Schlosser et al., "Filling the Memory Access Gap: A Case for On-Chip Magnetic Storage," Tecchnical Report CMU-CS-99-174, School of Computer Science, Carnegie Mellon University, pp. 1-19, Nov. 1999.

*Primary Examiner* — Adam R Giesy
(74) *Attorney, Agent, or Firm* — Oliff & Berridge, PLC (57) ABSTRACT

Device for recording data comprising microdots with free ends forming a convex surface and method for the production thereof The data recording device comprises a storage medium arranged facing a two dimensional array of microdots, of nanometric dimensions, formed directly on a substrate. An electronic circuit for addressing and controlling the microdots is integrated in the substrate. The microdots and/or substrate are shaped in such a way that the set of free ends of the microdots defines a convex surface, which enables a contact to be ensured in all cases between each of the microdots and the corresponding storage medium. The radius of curvature of the surface convex is preferably comprised between 1 m and 5 m.

23 Claims, 6 Drawing Sheets

U.S. PATENT DOCUMENTS

| | | |
|---|---|---|
| 2002/0172072 A1 | 11/2002 | Chen et al. |
| 2005/0047307 A1* | 3/2005 | Frommer et al. ............ 369/101 |
| 2005/0269653 A1 | 12/2005 | Gidon |

FOREIGN PATENT DOCUMENTS

| | | |
|---|---|---|
| EP | 1 168 334 A2 | 1/2002 |
| FR | 2 845 513 | 4/2004 |
| JP | A 11-176033 | 7/1999 |
| WO | WO 2004/032132 A2 | 4/2004 |
| WO | WO 2005/013270 A1 | 2/2005 |

* cited by examiner

DEVICE FOR RECORDING DATA COMPRISING MICRODOTS WITH FREE ENDS FORMING A CONVEX SURFACE AND METHOD FOR THE PRODUCTION THEREOF

BACKGROUND OF THE INVENTION

The invention relates to a data recording device comprising a two-dimensional array of microdots of nanometric dimensions formed directly on a substrate comprising electronic means for addressing and controlling the microdots, each microdot comprising a free end arranged facing a storage medium.

The invention also relates to a method for production of such a device.

STATE OF THE ART

In the data recording field, very large storage capacities have recently been achieved by implementing arrays of microdots having an apex of nanometric size. An actuator, which can be electromechanical, enables monolithic relative movement of the whole microdot array with respect to the surface of a medium constituting the storage medium.

In such a data recording device with tip effect, a perfect contact of all the microdots with the storage medium has to be guaranteed. Control of the position of each microdot individually is not envisageable for system complexity reasons. The microdots are however produced in collective manner by techniques derived from those of microelectronics, and a dispersion of the height of the microdots due to fabrication always remains. Although this dispersion is very small, typically around 100 nm, the longest of the microdots of an array presses on the storage medium more than the others.

To overcome this difficulty, each microdot is supported overhanging by one end of a cantilever, in a similar manner to the microdot arrays used in scanning near-field microscopy. The flexibility of the cantilever then enables the stress of a pressing force to be absorbed (U.S. Pat. No. 6,072,764 in particular).

Other solutions have been proposed by the applicant based on the use of a storage medium comprising a flexible membrane enabling the heightwise dispersions of the microdots to be compensated. The microdots can then be formed directly, without cantilevers, on a single base substrate in which the addressing and control circuit can also be integrated. This monolithic production of the addressing and control circuit and of the microdots enables the cost of the device to be reduced.

Thus, document WO-A-2004/032132 describes a storage medium comprising a flexible membrane supported by a frame forming a plurality of cells, each cell being associated with at least one microdot. To eliminate edge effects which reduce the occupation rate, the storage medium can comprise a double membrane with imbricated frames.

In document WO-A-2005/013270, the storage medium comprises a deformable storage layer, for example formed by a flexible polymer layer, absorbing the heightwise dispersion of the microdots.

Although this approach is efficient for absorbing local heightwise dispersions of the microdots, it does not enable contact of all the microdots with the storage medium to be ensured in all cases, while at the same time controlling the contact forces.

OBJECT OF THE INVENTION

The object of the invention is to provide a data recording device that does not present these shortcomings and that more particularly enables a contact between each of the microdots of an array and the corresponding storage medium to be ensured in all cases.

According to the invention, this object is achieved by the appended claims and more particularly by the fact that the set of free ends of the microdots defines a convex surface.

The invention also relates to a method for producing such a data recording device and more particularly a method for collective production of several devices.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

Figure 1:
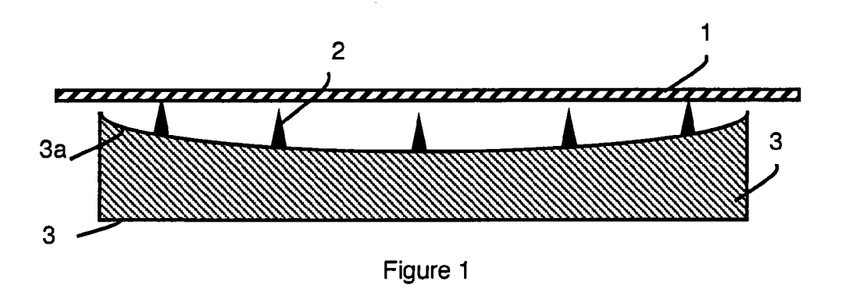
FIG. 1 schematically illustrates the contact problems due to deformation of a microdot support substrate.

FIG. 1 schematically illustrates the lack of contact between a storage medium 1 and some microdots 2 formed on a front face 3a of a substrate 3, when the front face 3a of the substrate presents a concave surface. Such deformations are in particular liable to occur during assembly of the device or due to thermal drifts. As illustrated in FIG. 1, the lateral microdots are in contact with the storage medium 1, which is substantially flat, whereas the central microdots are not in contact with the storage medium. The radius of curvature of the concave surface 3a, and consequently the distance between the end of the central microdots and the storage medium 1, are exaggerated in FIG. 1 to better highlight the problem encountered. The same type of problem arises in a similar way for other types of deformation of the front surface of the substrate, in particular in the case of a front face in the shape of a saddle.

According to the invention, this problem is solved by shaping the microdots 2 and/or the substrate 3 in such a way that the set of free ends of the microdots 2 (i.e. the peaks thereof) defines a convex surface. The free ends of the microdots, designed to come into contact with the storage medium 1, thus define an envelope of convex surface, and the free ends of all the microdots 2 then come into contact with the storage medium 1, the flexibility whereof is sufficient to absorb all the heightwise variations of the microdots.

Figure 2:
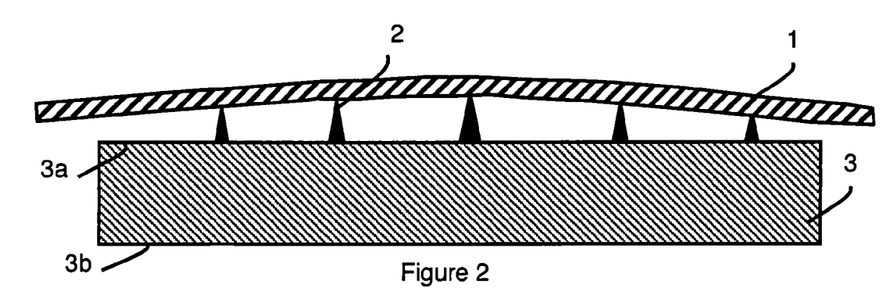
FIG. 2 schematically illustrates a particular embodiment of a device according to the invention in which the microdots have different heights defining a convex surface.

In a first embodiment illustrated in FIG. 2, the substrate 3 has a substantially flat front face 3a and rear face 3b, and the convexity of the outline of the microdots is obtained by formation of microdots 2 of different heights on the front face 3a of the substrate 3. The central microdots are therefore higher than the lateral microdots. The height gradient of the microdots is sufficient to take account of all the deformations liable to occur in the device and of the inevitable tolerances in the height of the microdots. Such a height gradient can in particular be obtained by inhomogeneous chemical etching of the microdots or by chemical-mechanical polishing.

Figure 3:
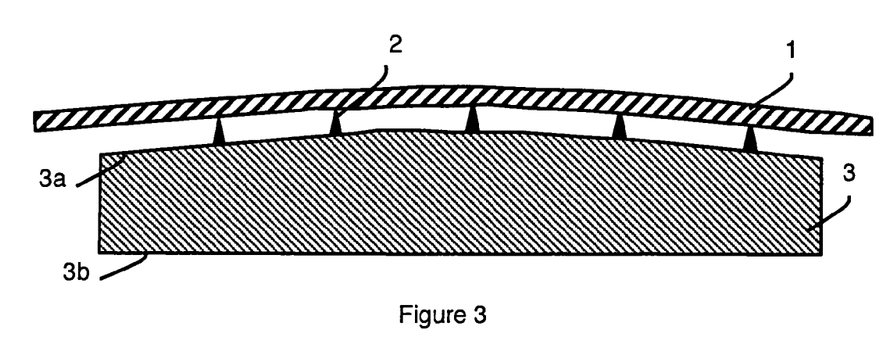
FIGS. 3 to 5 schematically illustrate different alternative embodiments of a data recording device according to the invention in which the microdots are formed on a convex front face of the substrate.

In other embodiments represented in FIGS. 2 and 3, the microdots all have substantially the same height and the convex outline is obtained by the use of a substrate 3 having a convex front face 3a. The camber of the front face 3a of the substrate 3 remains small but sufficient to take account of deformations liable to occur in the opposite direction during assembly of the device or due to thermal drifts.

It is also possible to combine these two effects by forming microdots of different heights (higher for the central microdots and lower for the lateral microdots) on the convex front face of the substrate.

In practice, the radius of curvature of the convex surface enveloping the free ends of the microdots is preferably comprised between 1 m and 5 m, more particularly about 2 m, which corresponds to a camber of about 10 nm on 100 μm.

The camber of the front face 3a of the substrate 3 can in particular be obtained by Chemical Mechanical Polishing (CMP) of the front face 3a before the microdots are formed. In this case, as illustrated in FIG. 3, the rear face 3b of the substrate 3 remains substantially flat, as in FIGS. 1 and 2.

Figure 4:
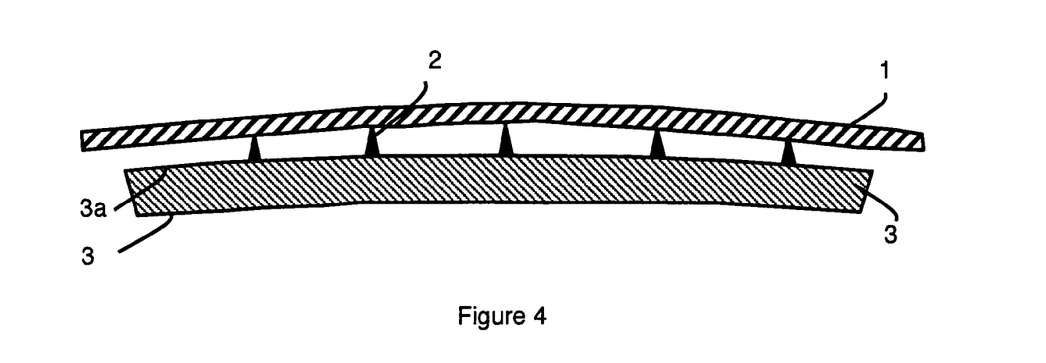

The camber of the front face 3a can also be obtained by applying a mechanical stress to the substrate 3. This mechanical stressing can for example be achieved by deposition of a compressive stressed thin layer (not represented) on the front face 3a or by deposition of a tensile stressed thin layer (not represented) on the rear face 3b. In both cases, applying such a mechanically compressive or tensile stressed thin layer causes a substantially parallel deformation of the front face 3a and the rear face 3b of the substrate 3, as represented in FIG. 4. In a particular embodiment, the thin layer is a layer of stressed silicon nitride or of stressed silicon with a thickness of a few hundred nanometers which can support a stress of 1GPa without any adverse effects.

The stressed layer can in particular be obtained by Ion Beam Sputtering (IBS) deposition. It can also have been previously stressed by another substrate, called original substrate, and transferred to the substrate 3 to be cambered by any suitable transfer technique, for example by bonding and thinning of the original substrate. The thickness of the substrate 3 is advantageously chosen to facilitate the cambering step. For example, the substrate 3 can have a reduced thickness of about 100 μm for example.

Figure 5:
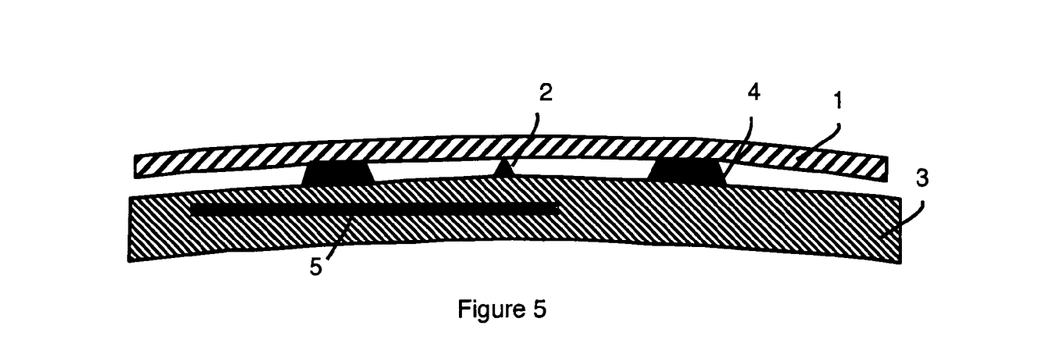

To reduce the contact force between the microdots 2 and the storage medium 1 while keeping a high assembly force, spacing pads 4 can be arranged on the convex front face 3a of the substrate. As represented in FIG. 5, the spacing pads 4 have substantially the same height as the microdots 2. The contact force of the storage medium 1 is therefore shared by the spacing pads and the microdots. The free ends of the spacing pads 4 are broader than the free ends of the microdots. They therefore have a contact surface with the storage medium 1 reaching for example several tens of μm², much larger than that of the microdots. The contact pressure exerted by the storage medium on the microdots is therefore reduced and friction wear is almost completely eliminated.

Figure 6:
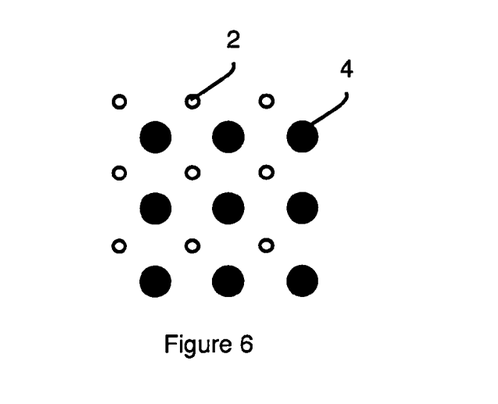
FIG. 6 illustrates the relative locations of the microdots and spacing pads of a device according to FIG. 5, in top view.

As represented in FIGS. 5 and 6, the spacing pads can be intercalated between the microdots 2, the spacing pads and microdots being for example arranged in staggered manner. In this particular embodiment, an array of spacing pads is thus intercalated in a microdot array.

Figure 7:
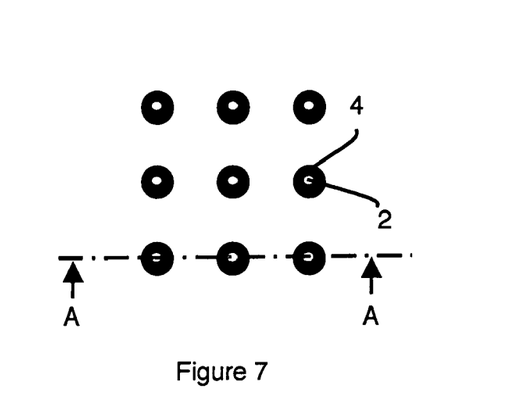
FIG. 7 illustrates another relative location of spacing pads and microdots, in top view.
Figure 8:
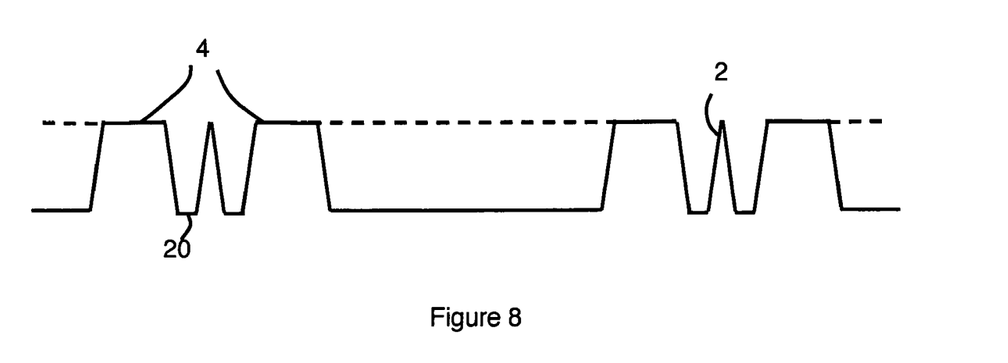
FIG. 8 schematically illustrates the outline of two adjacent pads and of the corresponding microdots in an alternative of the arrangement according to FIG. 7, in cross-section along the line A-A.

In the specific embodiment illustrated in FIGS. 7 and 8, the arrays of spacing pads and microdots are superposed, each spacing pad 4 then having an annular shape and surrounding a corresponding microdot 2. As illustrated in FIG. 8, a flat surface 20 is advantageously arranged at the bottom of each pad 4, at the periphery of the base of the corresponding microdot 2.

The microdots 2 and spacing pads 4 can be made of tungsten, for example in a layer of tungsten deposited on the front face 3a of the substrate 3 and etched by any known photolithography method. However the spacing pads 4 can also be made from a dielectric material, for example silicon nitride or silica, or from amorphous carbon or hard diamond-like carbon (DLC), having tribological properties.

In another alternative embodiment, represented schematically by a broken line in FIG. 8, the spacing arranged between the pads is eliminated. Each microdot can then be formed in a corresponding cavity of a layer covering the front face 3a of the substrate.

In all cases, the microdots 2 are formed directly, without cantilevers, on the basic substrate, in which the addressing and control circuit 5 can also be integrated, as represented in FIG. 5.

As indicated above, the flexibility of the storage medium 1 co-operates with the convex surface of the envelope of the microdot free ends to ensure contact between the microdots and the storage medium and to absorb all the height variations of the microdots. The storage medium 1 can in particular be of the type described in the above-mentioned patent applications (WO-A-2004/032132 and WO-A-2005/013270).

The data recording device generally comprises means enabling relative movement of the storage medium and microdots in the substantially horizontal plane of the storage medium. It can also comprise means for movement in a direction substantially perpendicular to the support substrate of the microdots (i.e. vertically) to bring the microdots into contact with the storage medium.

Figure 9:
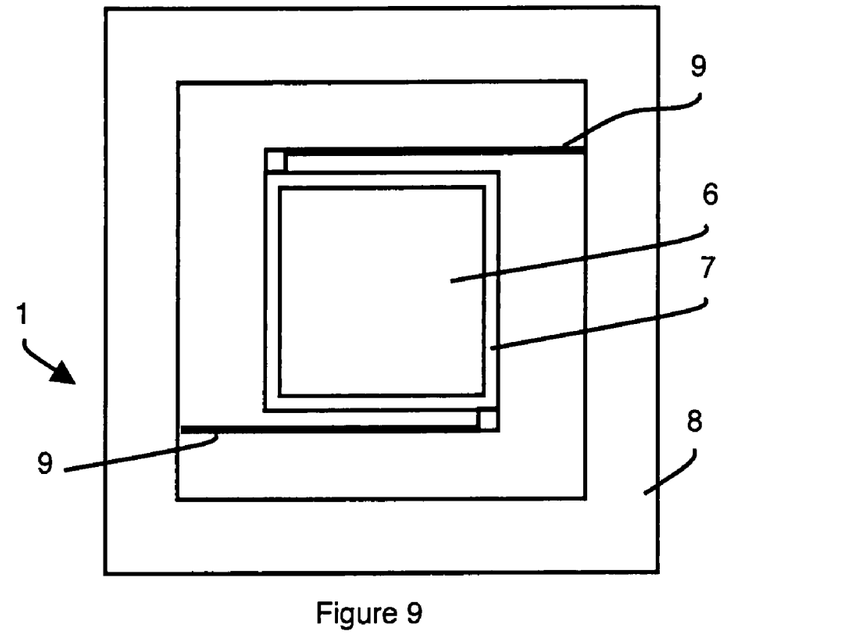
FIGS. 9 to 11 schematically illustrate three particular embodiments of a storage medium of a device according to the invention, in top view.
Figure 10:
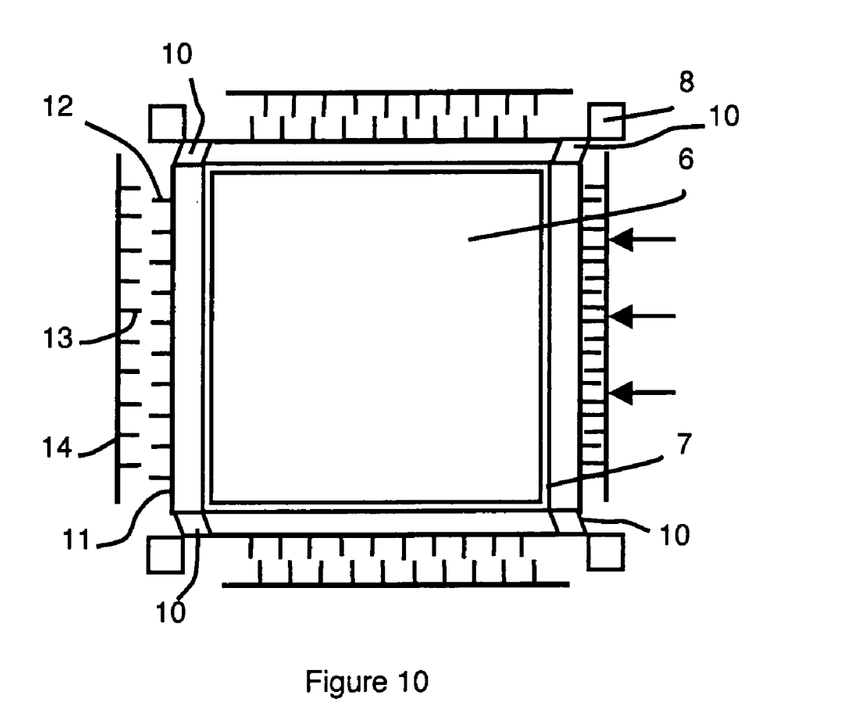
Figure 11:
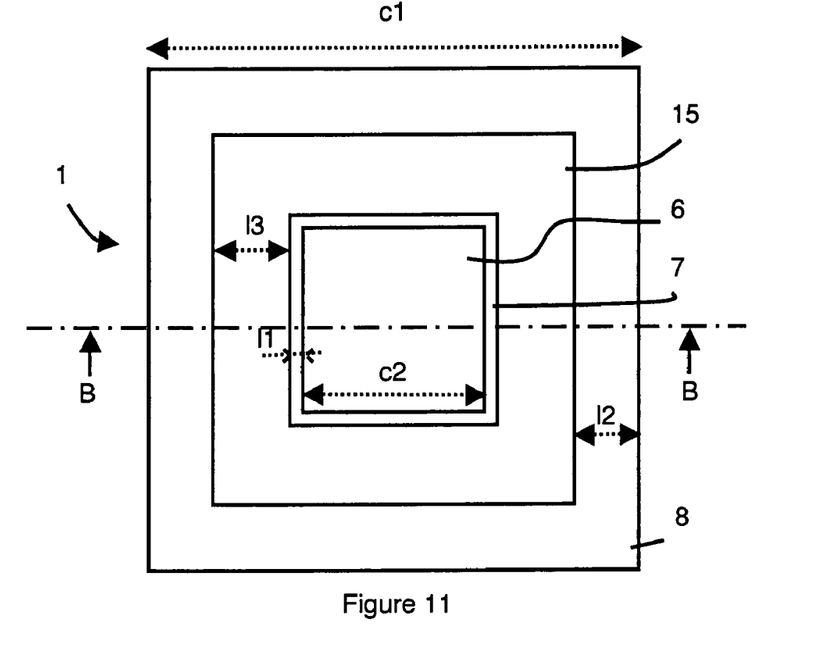

FIGS. 9 to 11 schematically illustrate, in top view, three particular embodiments of a storage medium more particularly suitable for use with a substrate with a convex surface according to the invention. In known manner, the storage medium 1 comprises a flexible membrane 6 supported by an internal frame 7. In the three embodiments, the internal frame 7 delineating the flexible membrane 6 is elastically fixed on an external frame 8, this flexible fixing enabling movement of the internal frame 7 and of the membrane 6 in their plane, whereas the external frame remains fixed.

In FIG. 9, the flexible fixing of the internal frame 7 onto the external frame 8 is constituted by two suspension arms 9. The latter are for example parallel to one another and to two opposite sides of the internal frame and respectively fixed at one of the ends thereof to diagonally opposite ends of the internal frame 7. Such a fixing enables movement of the membrane and of the internal frame in their plane with a single degree of freedom, i.e. perpendicularly to the suspension arms (vertically in the plane of FIG. 9). The internal frame 7 and external frame 8, preferably made of silicon, can be formed at the same time as the suspension arms in a silicon wafer supporting the membrane 6.

The embodiment illustrated in FIG. 10 enables movement in two dimensions of the membrane and of the internal frame in their plane. The flexible fixings connecting the internal frame 7 to the external frame 8 are fixings in the form of articulated parallelograms 10. Each corner of the internal frame 7 is connected to an apex of a parallelogram 10, the diagonally opposite apex whereof is connected to a fixed pillar constituting a corner of the external frame 8. Two adjacent articulated parallelograms are connected by connecting bars 11 respectively fixed to another apex of each parallelogram. Each connecting bar 11 can be provided with a row of outwardly salient fingers 12 designed to operate in conjunction with a row of inwardly salient fingers 13 of an associated actuator 14 arranged parallel to the connecting bar (two vertical actuators respectively arranged on the right and on the left of the internal frame 7 and two horizontal actuators respectively arranged below and above the internal frame in FIG. 10). Movement of an actuator 14 (to the left in the direction of the arrows in FIG. 10) thus causes a corresponding movement of the associated connecting bar and movement to the left in the plane of the frame 7 and of the membrane 6, due to the articulated parallelograms which deform. In the specific embodiment of FIG. 10, selective actuation of the four actuators 14 enables a very precise movement of the membrane in its plane. In an alternative embodiment, the actuators 14 are fixed and actuation thereof moves the connecting bars 11 towards one another, for example by electrostatic means.

A similar structure is described in the article "Filling the Memory Access Gap: A Case for On-Chip Magnetic Storage" by Steven W. Schlosser et al., Technical Report CMU-CS-99-174, School of Computer Science, Carnegie Mellon University, published in November 1999. However, in this article, this structure is associated with an array of microdots of the same height formed on a flat substrate. Elements of millimetric dimensions (storage medium and microdot array) then have to be aligned with nanometric precisions, while at the same time mastering the contact forces, which are about ten nanoNewtons. However the flatness and parallelism of the facing surfaces imply tolerances respectively less than 50nm and one microradiant. In the above-mentioned article, this is made possible by the use of cantilevers and of a costly dynamic alignment process.

On the contrary, the combination of a storage medium according to FIGS. 9 or 10 with a substrate 3 having a front face 3a, supporting the microdots 2, which is convex and/or with microdots of different heights defining an outline of convex surface guarantees a good redistribution of the assembly force between all the microdots. Indeed, when assembly takes place, the external frame 8 can be securely fixed to the substrate 3, while preserving freedom of movement of the membrane 6 in its plane. The assembly force then presses the storage medium, more particularly the membrane 6, onto the array of microdots 2. The elementary force exerted by each microdot 2 can be about 0.1 nN to 10 nN. It is a function of the radius of curvature selected. For example, the assembly force can then be greater than 1 mN. This force is fixed by the stiffness and deflection of the suspension arms 9 in the embodiment of FIG. 9. The stiffness is essentially determined by the characteristics of the material used, for example silicon, and by the geometry of the suspension arms.

Figure 12:
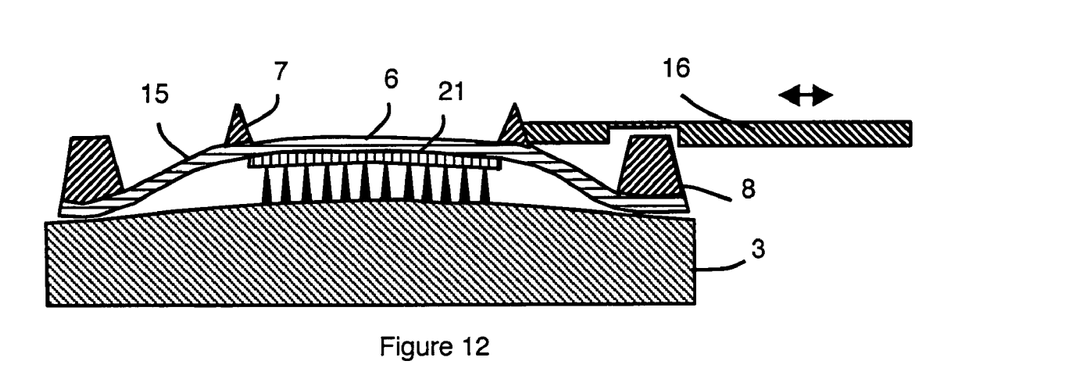
FIG. 12 represents the storage medium according to FIG. 11, in cross-section along the line B-B, as well as an associated actuator.

The same is the case with a storage medium according to FIGS. 11 and 12. In this embodiment, the flexible fixing means are formed by a fixing membrane 15 extending the flexible membrane 6 at the periphery thereof. Storage layers 21 covering the flexible membrane 6 on the front face of the storage medium (designed to come into contact with the microdots) complete the storage medium.

The membranes 6 and 15 can thereby be formed simultaneously in a single part by any suitable method, the membrane 6 simply being delineated by the internal frame 7. A known method consists in depositing a plastic material by spin coating on a silicon wafer constituting the rear face of the storage medium (opposite the front face thereof which is designed to come into contact with the microdots), which material is spread by centrifugal force. The plastic material used is preferably a polymer and more particularly a benzocyclobutene (BCB) based resin, such as CYCLOTENE™.

After deposition of the plastic material forming the membranes 6 and 15 and the storage layers 21, the internal frame 7 and external frame 8 can be obtained in conventional manner (photolithography, dry or chemical etching . . . ). For example, the frames 6 and 15 can be achieved, in the silicon wafer, by anisotropic chemical etching from the rear face of the storage medium through to the layer forming the membranes 6 and 15. The order of these steps (production of the membranes, production of the storage layers, and production of the frames) can be reversed if required depending on the process constraints relating to the materials used.

As represented in FIG. 12, the fixing membrane 15 thus constitutes a sort of outside skin which acts as support structure for the internal frame 7 delineating the flexible membrane 6, while at the same time giving the latter a freedom of movement both vertically to ensure that the membrane 6 is pressed against the microdots and horizontally to allow a flexible movement of the membrane in its own plane due to the action of actuators 16 operating in conjunction with the internal frame 6 (a single actuator 16 is represented in FIG. 10). The dimensions of the peripheral fixing membrane 15 fix the stiffness thereof. Its thickness is preferably about a few microns and its width is about a few millimeters.

For example, the respective dimensions of the different elements represented in FIG. 11 can be the following:
about 15 mm for the dimension c1 of the storage medium 1,
about 9.5 mm for the dimension c2 of the membrane 6,
about 0.25 mm for the width l1 of the internal frame 7,
about 0.5 mm for the width l2 of the external frame 8 and
about 2 mm for the width l3 of the fixing membrane 15.

Production of a storage medium according to FIGS. 11 and 12 presents the advantage of being simpler and therefore less expensive than that of a storage medium according to FIGS. 9 or 10, which moreover imposes large mechanical stresses at the level of the suspension arms 9 or of the articulated parallelograms 10.

Figure 13:
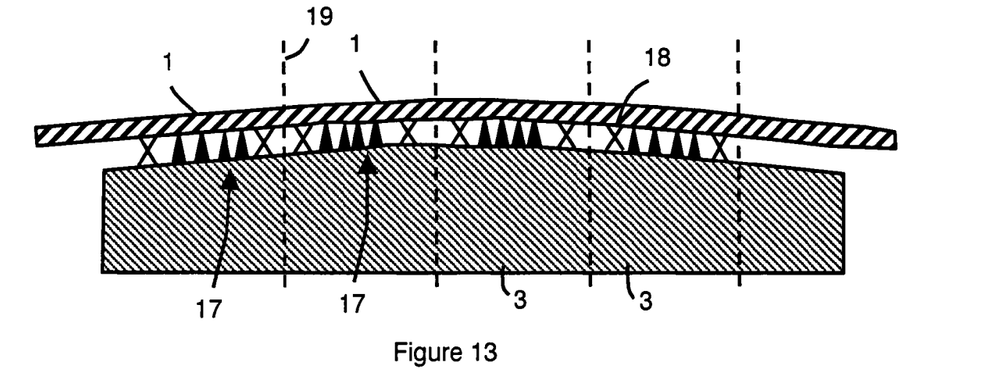
FIGS. 13 and 14 schematically illustrate, in cross-section, a method for production of recording devices in collective mode, respectively according to FIGS. 3 and 4.
Figure 14:
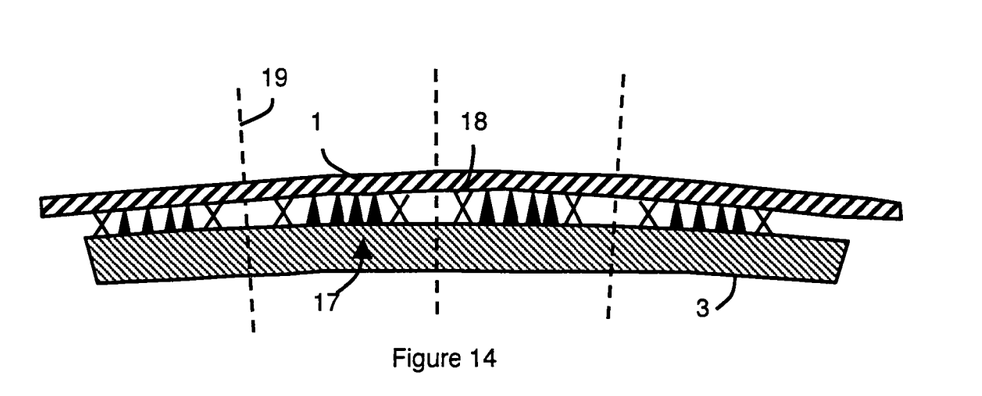

Several data recording devices according to the invention can be produced simultaneously as illustrated schematically in FIGS. 13 and 14, thus enabling the production cost to be reduced. In this way, several microdot arrays 17 are formed at the same time on the convex front face of one and the same silicon substrate to constitute a first assembly. The corresponding addressing and control circuits are preferably formed previously in the substrate, underneath the arrays 17. In FIG. 13, the convexity of the front face of the substrate is obtained, as in FIG. 3, by chemical-mechanical polishing, whereas in FIG. 14 the curvature of the substrate is obtained by mechanical stressing as in FIG. 4. Likewise, several storage media are formed simultaneously to constitute a second assembly. In FIGS. 13 and 14, the storage media are schematized in the form of a single flexible membrane. However, it is clear that any type of storage medium described above, in particular with reference to FIGS. 9 to 12, can be used. The first and second assemblies are then assembled in such a way that a microdot array 17 comes into contact with the corresponding storage medium 1. In FIGS. 13 and 14, the assembly is schematized by fixing zones 18 (represented by Xs) connecting the substrate 3 to the storage medium 1 on each side of the microdot array 17. The assembly is then cut along the broken lines 19, between two adjacent fixing zones 18 or through a fixing zone 18, to form the individual recording devices. In the case of a substrate having a camber formed by mechanical stressing (FIG. 14), the camber can appear in fact when the cutting operation is performed.

The invention claimed is:

1. A data recording device, comprising:
   a two-dimensional array of microdots of nanometric dimensions formed directly on a substrate comprising electronic means for addressing and controlling the microdots, each microdot comprising a free end arranged facing a storage medium, wherein the free ends of the microdots define together a convex surface.

2. The device according to claim 1, wherein the convex surface has a radius of curvature comprised between 1 m and 5 m.

3. The device according to claim 1, wherein the convex surface has a radius of curvature of about 2 m.

4. The device according to claim 1, wherein the microdots have different heights so as to define said convex surface.

5. The device according to claim 1, wherein the substrate comprising a rear face and a front face whereon the microdots are formed, said front face is convex so that the set of ends of the microdots defines said convex surface.

6. The device according to claim 5, comprising spacing pads formed on said front face.

7. The device according to claim 6, wherein the spacing pads and microdots are arranged in staggered manner.

8. The device according to claim 6, wherein each spacing pad is annular and surrounds a microdot.

9. The device according to claim 5, wherein each microdot is formed in a corresponding cavity of a layer covering said front face.

10. The device according to claim 1, wherein the storage medium comprises a flexible membrane delineated by an internal frame and flexible fixing means for fixing the internal frame to an external frame, enabling movement of the membrane in its plane.

11. The device according to claim 10, wherein the flexible fixing means comprise suspension arms.

12. The device according to claim 10, wherein the flexible fixing means comprise fixings in the form of articulated parallelograms.

13. The device according to claim 10, wherein the flexible fixing means are formed by a fixing membrane extending the flexible membrane at the periphery thereof.

14. The device according to claim 13, wherein the flexible membrane and the fixing membrane are made of plastic.

15. The device according to claim 14, wherein the fixing means comprise a benzocyclobutene-based resin.

16. A method for production of a device according to claim 5, comprising formation on the substrate of a convex front face whereon the microdots are arranged.

17. The method according to claim 16, wherein the convex front face of the substrate is achieved by chemical mechanical polishing of said face.

18. The method according to claim 16, wherein the convex front face of the substrate is achieved by mechanical stressing.

19. The method according to claim 18, wherein the convex front face of the substrate is achieved by deposition of a compressive stressed thin layer on said front face.

20. The method according to claim 18, wherein the convex front face of the substrate is achieved by deposition of a tensile stressed thin layer on the rear face of the substrate.

21. The method according to claim 19, wherein said thin layer is a layer of silicon nitride or silica with a thickness of a few nanometers.

22. The method according to claim 19, wherein said thin layer is deposited by ion beam sputtering.

23. The method according to claim 16, wherein
   a plurality of arrays of microdots are formed simultaneously on the convex front face of one and the same substrate to constitute a first assembly,
   a plurality of storage media are formed simultaneously to constitute a second assembly,
   the first and second assemblies are assembled in such a way that an array of microdots comes into contact with the corresponding storage medium, and
   the assembly is then cut to form individual recording devices.

* * * * *